United States Patent
Yen

(10) Patent No.: US 9,138,924 B2
(45) Date of Patent: Sep. 22, 2015

(54) MANUFACTURING METHOD OF DECORATED MOLDING ARTICLE AND MANUFACTURING METHOD OF DECORATED FILM

(71) Applicant: Prior Company Limited, Taipei (TW)

(72) Inventor: Jui-Hua Yen, New Taipei (TW)

(73) Assignee: Prior Company Limited, Taipei (TW)

( * ) Notice: Subject to any disclaimer, the term of this patent is extended or adjusted under 35 U.S.C. 154(b) by 0 days.

(21) Appl. No.: 14/251,663

(22) Filed: Apr. 14, 2014

(65) Prior Publication Data

US 2015/0190955 A1 Jul. 9, 2015

(30) Foreign Application Priority Data

Jan. 6, 2014 (TW) .............................. 103100400 A

(51) Int. Cl.
| | |
|---|---|
| H01L 23/00 | (2006.01) |
| B29C 45/14 | (2006.01) |
| B29C 45/16 | (2006.01) |
| B29C 35/08 | (2006.01) |
| B29K 101/12 | (2006.01) |
| B29L 7/00 | (2006.01) |

(52) U.S. Cl.
CPC ....... *B29C 45/14827* (2013.01); *B29C 35/0805* (2013.01); *B29C 45/1671* (2013.01); *B29C 2035/0827* (2013.01); *B29K 2101/12* (2013.01); *B29L 2007/008* (2013.01)

(58) Field of Classification Search
USPC .......................................................... 257/211
See application file for complete search history.

(56) References Cited

U.S. PATENT DOCUMENTS

| | | | |
|---|---|---|---|
| 2003/0071340 A1* | 4/2003 | Derderian ..................... | 257/686 |
| 2004/0056538 A1* | 3/2004 | Du et al. ......................... | 310/43 |
| 2007/0133183 A1* | 6/2007 | Urbach et al. ................ | 361/760 |
| 2015/0091177 A1* | 4/2015 | Hong et al. ................... | 257/773 |

* cited by examiner

*Primary Examiner* — Thao P Le
(74) *Attorney, Agent, or Firm* — Jianq Chyun IP Office

(57) ABSTRACT

Manufacturing method of decorated molding article is provided. The manufacturing method of decorated molding article includes the following steps. A hard coating layer is formed on a substrate. The hard coating layer has an uneven surface and a planar surface, wherein the substrate contacts with the planar surface. A pattern layer is formed on and completely covers the uneven surface of the hard coating layer. An adhesive layer is formed on the pattern layer so as to form a decoration film. A transfer molding process is performed such that the decoration film adheres to an article through the adhesive layer. The transfer molding process includes performing a heating procedure such that the substrate is separated from the planar surface of the hard coating layer.

7 Claims, 1 Drawing Sheet

MANUFACTURING METHOD OF DECORATED MOLDING ARTICLE AND MANUFACTURING METHOD OF DECORATED FILM

CROSS-REFERENCE TO RELATED APPLICATION

This application claims the priority benefit of Taiwan application serial no. 103100400, filed on Jan. 6, 2014. The entirety of the above-mentioned patent application is hereby incorporated by reference herein and made a part of this specification.

BACKGROUND OF THE INVENTION

1. Field of the Invention

The invention relates to a decoration film and a manufacturing method thereof, and a manufacturing method of a decorated molding article.

2. Description of Related Art

In general, decorations such as pattern or text formed on the shell surface of the object are mainly formed by spraying process or printing process, so as to show the specific visual effects and to increase the variation in appearance of the object. However, since the spraying process has shortcomings such as time-consuming, process complexity, poor thickness uniformity, etc, and thus the spraying process is not appropriate to use in mass production. To solve the problems above, various specific decoration processes using a decoration film have been proposed. For example, in-mold decoration (IMD) has then become an alternative choice of forming pattern and text on the object surface. IMD is mainly as follows. A transferring film printed with pattern is placed in a mold such as an injection molding machine etc. Then, resin is perfused into the mold such that the resin and the transferring film are combined with each other. After the resin is cooled, a decorated molding article is taken out from the mold, and the IMD process is completed.

Another process is out mold decoration (OMD), which is a three-dimensional coating technique using a high-pressure vacuum transfer to directly coat and mold a transparent film (pattern layer) printed with pattern or text on the outer surface of the article. Through the OMD, tactile effects and visual effects of the appearance may be achieved, and the OMD may be applied to various shell material, which may further increase the applications of the decoration of the product appearance. In the decoration film used in OMD, a release layer is often disposed between a substrate and other film layers (such as a hard coating layer or the pattern layer), so as to make the substrate temporarily adhere to the other film layers and to strip the other film layers from the substrate after the transfer procedure. Accordingly, the disposition of the release layer and the stripping procedure may inevitably increase process costs and time of the decorated molding article.

SUMMARY OF THE INVENTION

The invention provides a decoration film and manufacturing method thereof, and manufacturing method of decorated molding article, by which other film layers can be separated from a substrate of the decoration film without a disposition of a release layer.

The manufacturing method of decorated molding article of the invention includes the following steps. A hard coating layer is formed on a substrate. The hard coating layer has an uneven surface and a planar surface, wherein the substrate contacts with the planar surface. A pattern layer is formed on and completely covers the uneven surface of the hard coating layer. An adhesive layer is formed on the pattern layer so as to form a decoration film. A transfer molding process is performed such that the decoration film adheres to an article through the adhesive layer. The transfer molding process includes performing a heating procedure such that the substrate is separated from the planar surface of the hard coating layer.

In an embodiment of the invention, temperature of the heating procedure is 50° C. to 300° C.

In an embodiment of the invention, time of the heating procedure is 1 to 120 seconds.

In an embodiment of the invention, material of the hard coating layer includes UV-curable resin.

In an embodiment of the invention, the transfer molding process further includes performing a pressurizing procedure after performing the heating procedure to adhere the decoration film to the article.

In an embodiment of the invention, method of forming the hard coating layer on the substrate includes: forming a resin material layer on the substrate; using a mold to stamp the resin material layer, such that the resin material layer has a pattern; and curing the resin material layer and releasing the mold therefrom to form the hard coating layer.

The manufacturing method of decoration film of the invention includes the following steps. A hard coating layer is formed on a substrate. The hard coating layer has an uneven surface and a planar surface, wherein the substrate contacts with the planar surface. A pattern layer is formed on and completely covers the uneven surface of the hard coating layer. An adhesive layer is formed on the pattern layer so as to form a decoration film.

The decoration film of the invention includes a substrate, a hard coating layer, a pattern layer and an adhesive layer. The hard coating layer is disposed on the substrate, wherein the hard coating layer has an uneven surface and a planar surface. The substrate contacts with the planar surface of the hard coating layer. The pattern layer is disposed on the uneven surface of the hard coating layer, and shape of one of the surface of the pattern layer is complementary to the uneven surface of the hard coating layer. The adhesive layer is disposed on the pattern layer, and the pattern layer is located between the hard coating layer and the adhesive layer.

According to the above, in the invention, the hard coating layer may be separated from the substrate by heating when transferring the decoration film to the article without the need to dispose a release layer between the substrate and the hard coating layer, and thus the process may be effectively simplified and the costs may be reduced effectively. In addition, the decorated molding article manufactured in the invention may provide the users with smooth tactile effects and three-dimensional visual effects simultaneously, and thus special decorative effects of the decorated molding article which are unlike the previous ones may be provided.

In order to make the aforementioned features and advantages of the invention comprehensible, embodiments accompanied with figures are described in detail below.

DESCRIPTION OF EMBODIMENTS

The invention is described in detail with reference to the accompanying figures. However, the invention may be embodied in various forms and is not limited to the embodiments described herein. Orientation terms used in the following embodiments, such as "above", "below", and the like, are merely referring to the orientation illustrated in the figures. Therefore, the orientation terms are used to describe the invention in detail rather than to limit the invention. In addition, the size and relative size of each layer may be exaggerated in the figures for clarity.

Figure 1:
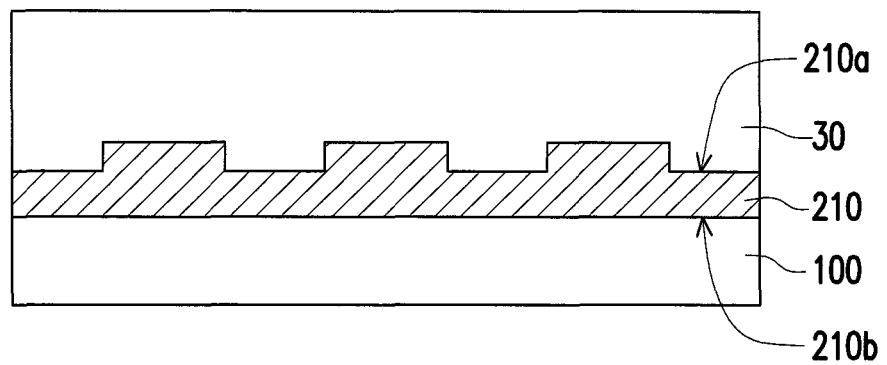
FIG. 1 to FIG. 3 are schematic diagrams of manufacturing method of decorated molding article according to an embodiment of the invention.
Figure 2:
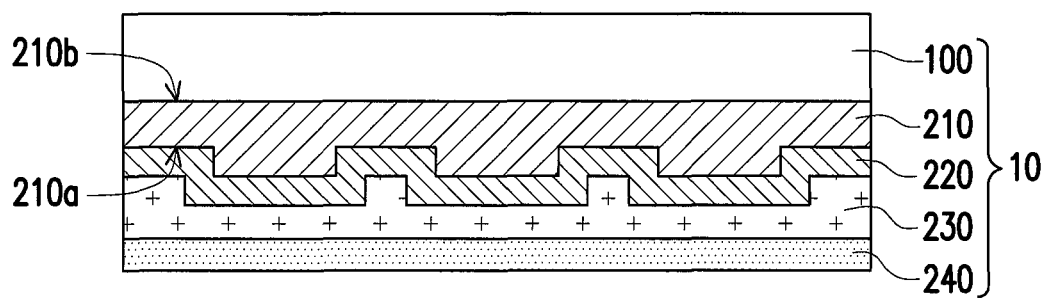
Figure 3:
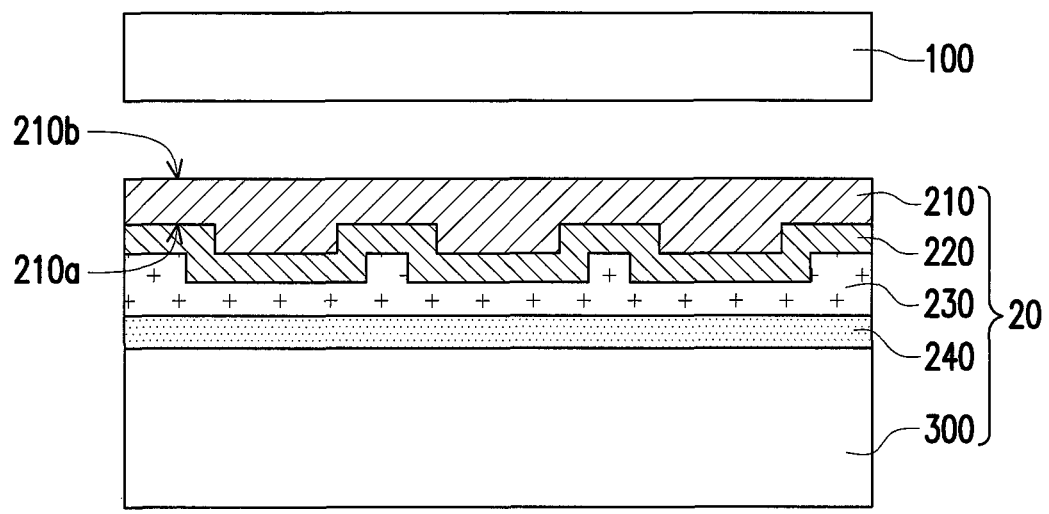

FIG. 1 to FIG. 3 are schematic diagrams of manufacturing method of decorated molding article according to an embodiment of the invention. Please refer to FIG. 1. First, a hard coating layer 210 is formed on a substrate 100. The substrate 100 is such as a flexible substrate, wherein the material thereof may be polycarbonate (PC), acrylonitrile butadiene styrene (ABS), polyethylene terephthalate (PET), polymethylmethacrylate (PMMA), polyoxymethylene (POM), polybutylene terephthalate (PBT), polypropylene (PP), methylmethacrylate-styrene (MMA-St, MS) copolymer, polystyrene (PS), or the combinations thereof, but the invention is not limited thereto.

In an embodiment, a hard coating layer 210 may be UV-curable resin which has high light transmittance and anti-reflective characteristics, such as acrylic resin, polyurethane (PU), epoxy resin, etc. The hard coating layer 210 may has a quite hardness to provide scratch-resistant and wear-resistant functions.

In detail, the method of forming the hard coating layer 210 is, for example, as following steps. The uncured resin material layer is stamped by a mold 30, wherein a designed pattern is on the mold 30, and the pattern on the mold 30 is transferred to the resin material layer by stamping. Next, the resin material layer is irradiated with UV such that the resin material layer is cured to form a hard coating layer 210. Then, the mold 30 is removed. Through the stamping by the above mold 30, the hard coating layer 210 is made to have an uneven surface 210a and a planar surface 210b, wherein the substrate 100 contacts with the planar surface 210b of the hard coating layer 210. Since the hard coating layer 210 has the high light transmittance, the viewer's line-of-sight may pass across the hard coating layer 210 to the inside pattern, thereby providing the decoration film with different textures.

Next, please refer to FIG. 2. A pattern layer 220 is formed on and completely covers the uneven surface 210a of the hard coating layer 210. The pattern layer 220 is, for example, formed of a opaque material. The pattern layer 220 may be an evaporation layer formed by evaporation methods or a printing layer formed by printing methods. In detail, the pattern layer 220 may be composed by the evaporation from metal targets. In addition, the pattern layer 220 may also be composed of printing inks or printable material. For example, the pattern layer 220 may be an ink single layer, an ink multilayer, or a patterned ink layer, so as to show a single-color pattern, a multi-color pattern, or a desired pattern, respectively. By any suitable printing process (such as gravure printing process, screen printing process, flexographic printing process, offset printing process, reverse printing process, inkjet printing process, etc.), the ink is able to be transferred on the hard coating layer 210 to form the pattern layer 220. Material of the pattern layer 220 includes polyurethane (PU) or polyacrylate, etc. which is mixed with inorganic material.

Specifically, the uneven surface 210a of the hard coating layer 210 is covered with the pattern layer 220 such that surface shape of the pattern layer 220 is complementary to the uneven surface 210a of the hard coating layer 210. That is, the pattern on the hard coating layer 210 may be transferred to the pattern layer 220, and thus the pattern layer 220 may has the three-dimensional texture structure thereon. Since the hard coating layer 210 has certain degree of transparency and the pattern layer 220 is made of the opaque material, the viewer may see the structure and the color of the three-dimensional textures of the pattern layer 220 through the hard coating layer 210. When the material of the pattern layer 220 is metal, the appearance with metallic luster may be provided. When the material of the pattern layer 220 is the color ink, the appearance with single color, multi color, or more diverse color may be provided. The three-dimensional texture structure described above may be text or pattern, etc.

Next, a material layer 230 may be selectively formed on the surface of the pattern layer 220. The material layer 230 is a coating layer formed by coating methods. The material layer 230 may fill the uneven surface of the pattern layer 220 to provide a planar surface, and thus facilitating the subsequent processing of the film layers.

Then, an adhesive layer 240 is formed on the material layer 230 to complete the manufacturing of the decoration film 10. The adhesive layer 240 may be hot melt adhesive, UV-curable adhesive, photo-curable adhesive, or electron-curable adhesive. The adhesive layer 240 is selected from, for example, at least one material of polyacrylate, polymethacrylate, polystyrene, polycarbonate, polyurethane, polyester, polyamide, epoxy resin, ethylene vinylacetate copolymer (EVA), or thermoplastic elastomer, or copolymers, mixtures, or composites thereof. Furthermore, in the embodiment without forming the material layer 230, the adhesive layer 240 may also be formed on the surface of the pattern layer 220.

Next, please refer to FIG. 3. A transfer molding process is performed. First, the decoration film 10 is adhered to an outer surface of an article 300 through the adhesive layer 240. In an embodiment, a high-pressure transfer molding process may such as include the following steps. First, a heating procedure is performed to the decoration film 10 to soften the decoration film 10. Next, making the decoration film 10 contact with the article 300, and a pressurizing procedure is performed on the decoration film 10 and the article 300, whereby the decoration film 10 is transferred to the article 300. Temperature of the heating procedure is about 50° C. to 300° C. Duration of the heating procedure is about 1 to 120 seconds.

Through the high-temperature and high-pressure vacuum transfer process, which is performed by first softening the decoration film 10 through high-temperature baking and then pressurizing and molding the decoration film 10 to cover it on the article 300, the adhesive layer 240 of the decoration film 10 is able to be adhered to the outer surface of the article 300. Accordingly, the decoration film 10 is tightly adhered to the article 300 using the adhesive layer 240. It should be noted that, during the heating procedure, adhesive capacity between the substrate 100 and hard coating layer 210 is decreased such that the substrate 100 and hard coating layer 210 are easily separated. Accordingly, after the pressurizing procedure, the substrate 100 may be easily released from the hard coating layer 210 and the manufacturing of the decorated molding article 20 is completed. In other words, comparing to the conventional decoration techniques of which the release layer is disposed between the substrate 100 and the hard coating layer 210, in the invention, the substrate 100 and the hard coating layer 210 may be separated through the heating procedure without the need to dispose the release layer, and thus the process may be effectively simplified and the manufacturing costs may be reduced effectively.

Depending on the application of the decorated molding article of the invention, the article 300 may be shells or components of electronic devices or vehicles, for example, shells or components of mobile phones, digital cameras, personal digital assistant (PDA), notebook, desktop computers, touch panel, TV, globe position system (GPS) equipments, automobiles monitor, navigators, display, digital photo frames, DVD players, automobile decorative panels, automobile dashboards, clocks, radios, toys, watches, or other electronic products need decoration. In an embodiment, material of the outer surface of the article 300 may be plastic, metal, carbon fiber, glass, or other various molded shell material, wherein the article 300 is such as the article which undergoes suitable pre-treatment process such that the article with the desired properties is manufactured. For example, when the material of the article is plastic, the article (such as a plastic shell, etc.) may be obtained through injection molding process using injection molding mold. Or, when the material of the article is metal, the metal article (such as a metal shell, etc.) may be obtained by performing a surface treatment to the metal first.

In summary, in the invention, the hard coating layer may be separated from the substrate by heating when transferring the decoration film to the article without the need to dispose the release layer between the substrate and the hard coating layer, and thus the process may be effectively simplified and the costs may be reduced effectively. In addition, rather than directly exposing the pattern with texture structure on the outer surface of the decorated molding article, in the invention, the planar surface of the hard coating layer faces the external environment. Accordingly, it is difficult for the three-dimensional texture structure on the outer surface of the decorated molding article to be disappeared due to wear and tear, and dirt is not easy to be formed in the three-dimensional texture structure. Furthermore, the uneven surface of the hard coating layer faces the article and is complementary to the shape of the pattern layer, such that the pattern layer also has the certain three-dimensional texture structure. Accordingly, the viewers may see the three-dimensional texture structure of the pattern layer through the hard coating layer. In other words, the decorated molding article manufactured in the invention may provide the users with the smooth tactile effects and the three-dimensional visual effects simultaneously, and thus the special decorative effects of the decorated molding article which are unlike the previous ones may be provided.

It will be apparent to those skilled in the art that various modifications and variations can be made to the structure of the disclosed embodiments without departing from the scope or spirit of the invention. In view of the foregoing, it is intended that the disclosure cover modifications and variations of this specification provided they fall within the scope of the following claims and their equivalents.

What is claimed is:

1. A manufacturing method of a decorated molding article, comprising:
   forming a hard coating layer on a substrate, the hard coating layer has an uneven surface and a planar surface, wherein the substrate contacts with the planar surface;
   forming a pattern layer on the uneven surface of the hard coating layer, wherein the pattern layer completely covers the uneven surface of the hard coating layer;
   forming an adhesive layer on the pattern layer to form a decoration film; and
   performing a transfer molding process, to adhere the decoration film to an article through the adhesive layer, wherein the transfer molding process comprises performing a heating procedure, such that the substrate is separated from the planar surface of the hard coating layer.

2. The manufacturing method of decorated molding article as claimed in claim 1, wherein a temperature of the heating procedure is 50° C. to 300° C.

3. The manufacturing method of decorated molding article as claimed in claim 1, wherein a duration of the heating procedure is 1 to 120 seconds.

4. The manufacturing method of decorated molding article as claimed in claim 1, wherein a material of the hard coating layer comprises UV-curable resin.

5. The manufacturing method of decorated molding article as claimed in claim 1, wherein the transfer molding process further comprises performing a pressurizing procedure after performing the heating procedure to adhere the decoration film to the article.

6. The manufacturing method of decorated molding article as claimed in claim 1, wherein a method of forming the hard coating layer on the substrate comprises:
   forming a resin material layer on the substrate;
   using a mold to stamp the resin material layer, such that the resin material layer has a pattern; and
   curing the resin material layer and releasing the mold therefrom to form the hard coating layer.

7. A manufacturing method of a decoration film, comprising:
   forming a hard coating layer on a substrate, the hard coating layer has an uneven surface and a planar surface, wherein the substrate contacts with the planar surface;
   forming a pattern layer on the uneven surface of the hard coating layer, wherein the pattern layer completely covers the uneven surface of the hard coating layer;
   forming an adhesive layer on the pattern layer to form the decoration film.

\* \* \* \* \*